United States Patent Office 3,475,372
Patented Oct. 28, 1969

3,475,372
FLAME RESISTANT POLYCARBONATES
Clarence L. Gable, Bridgeville, Pa., assignor to Mobay Chemical Company, Pittsburgh, Pa., a corporation of Delaware
No Drawing. Filed Aug. 18, 1966, Ser. No. 573,173
Int. Cl. C08g 51/62; C09k 3/28
U.S. Cl. 260—45.75    4 Claims

ABSTRACT OF THE DISCLOSURE

Polycarbonate polymers containing a sufficient amount of a metal salt to render the polymer flame resistant wherein the metal salt has the formula $M(X)_n$ in which M is a metal, X is an anion which renders the metal soluble in the organic system and $n$ is an integer equal to the valence of M.

---

This invention relates to polycarbonates, particularly to flame resistant polycarbonates, and more particularly to self-extinguishing polycarbonate compositions.

Polycarbonates derived from reactions involving organic dihydroxy compounds and carbonic acid derivatives have found extensive commercial application because of their excellent physical properties. These thermoplastic polymers appear to be particularly suited for the manufacture of molded products where impact strength, rigidity, toughness and excellent electrical properties are required. However, these polymers exhibit a brief though definite burning time when contacted with an open flame and are therefore considered only semi-self-extinguishing. In addition, stabilizers or other functional additives which are normally used in polycarbonates will further modify the normally semi-self-extinguishing property of the plastic to such an extent that these polycarbonates may not meet a specified requirement for flammability resistance in applications where high temperatures and/or exposure to fire may be encountered.

Also, stabilizers and functional additives, such as monomeric phosphites, phosphoric acid esters and thiophosphoric acid esters containing halogenated alkyl radicals have been incorporated in polymers to increase their flame resistance properties. However, these stabilizers have to be employed in such large quantities in order to obtain the flame resistant characteristics that they reduce the desirable physical properties of the polymers, such as the impact strength, and even cause considerable deterioration in the other physical properties such as resistance to hydrolysis. Other phosphorous compounds have been employed as flame retarding agents, however, they suffer from the same disadvantages as the monomeric phosphites and phosphoric acid esters and thus do not enhance the flame resistant properties of polycarbonates without unduly modifying their physical properties.

Therefore, it is an object of this invention to provide a self-extinguishing polycarbonate. Another object of this invention is to provide a polycarbonate which has a substantial degree of flame resistance. Still another object of this invention is to provide a self-extinguishing polycarbonate without unduly modifying its physical properties. A further object of this invention is to provide a method for preparing self-extinguishing polycarbonates. A still further object of this invention is to incorporate minute quantities of self-extinguishing agents in a polycarbonate resin without modifying its physical properties.

The foregoing objects and others which will become apparent from the following description are accomplished in accordance with this invention, generally speaking, by adding metallic salts in sufficient amount to a polycarbonate composition to render the composition flame-resistant.

Metallic salts which are capable of rendering polycarbonate compositions flame-resistant are represented by the general formula $$M(X)_n$$

wherein M represents a metal, X represents an anion which renders the metal soluble in the organic system and $n$ is an integer equal to the valence of the metal M. Examples of suitable metals which may be employed are those classified in Groups II, IV, VI, VII and VIII of the periodic system of elements according to the Handbook of Chemistry and Physics, 46th edition (The Chemical Rubber Company). Metals represented by M above which appeared to have the greatest effect on the flame resistance of polycarbonates are tin, lead, zinc, iron, magnesium, manganese, calcium, cadmium, cobalt and selenium. Suitable anions represented by X above which exert a solubilizing effect on the metal are organic complexes such as organic dithiocarbamates having the formula

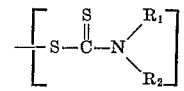

wherein $R_1$ and $R_2$ which may be the same or different are monovalent hydrocarbon radicals having from 1 to 20 carbon atoms. The hydrocarbon radicals may be alkyl, aralkyl, aryl or cycloalkyl groups. Examples of alkyl groups are methyl, ethyl, butyl, isobutyl, pentyl and various positioned isomers thereof such as, for example, 1-methylbutyl, 2-methylbutyl, 3-methylbutyl, 1,1-dimethylpropyl, 1,2-dimethylpropyl, 2,2-dimethylpropyl, 1-ethylpropyl and corresponding straight and branched chain isomers of hexyl, octyl, decyl, dodecyl, tetradecyl, hexadecyl, octadecyl, eicosyl, and the like; aryl groups such as phenyl, alpha- or beta-naphthyl, alpha- or beta-anthryl and the like; aralkyl groups such as benzyl, alpha- and beta-phenylethyl, alpha- and beta-phenylpropyl, alpha- and beta-phenylbutyl, alpha-(a'-naphthyl)ethyl, alpha-(a'-naphthyl)-propyl, alpha-(a'-naphthyl)-butyl and the corresponding alpha- and beta-naphthyl derivatives of n-amyl and the various positioned isomers thereof such as 1-methylbutyl, 2-methylbutyl, 3-methylbutyl, hexyl, octyl and the like; alkaryl radicals such as o-, m-, and p-tolyl, 2,3-xylyl, 2,6-xylyl, 3,4-xylyl, o-, m-, and p-cumenyl, o-, m-, and p-ethylphenyl, 2-methyl-a-naphthyl, 3-methyl-a-naphthyl, 6-methyl - a - naphthyl, 8-ethyl-b-naphthyl, and the like and cycloalkyl radicals such as cyclopropyl, cyclobutyl, cyclohexyl, cyclooctyl and the like.

Other anions represented by X above are carboxylic acids having the formula

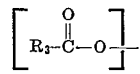

wherein $R_3$ is a saturated or unsaturated monovalent hydrocarbon radical having from 4 to 20 carbon atoms such as butyl, butenyl, hexyl, hexenyl, octyl, octenyl, decyl, decenyl, dodecyl, dodecenyl, tetradecyl, tetradecenyl, hexadecyl, hexadecenyl, octadecyl, octadecenyl, eicosyl, eicosenyl, 3,3-dimethyl-1-butenyl, 2,3-dimethyl-3-butenyl, 1-methyl-1-ethyl-2-propenyl, and the like; substituted and unsubstituted mercaptobenzothiazoles of the formula

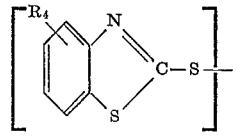

wherein $R_4$ represents hydrogen, halogen or a substituted or unsubstituted monovalent hydrocarbon radical having from 1 to 4 carbon atoms such as methyl, ethyl, propyl and butyl. $R_4$ may also be substituted with halogen atoms such as chlorine, fluorine or bromine.

Other anions represented by X above are the acetyl acetonates having the following formula

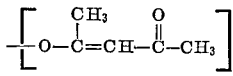

and the halides such as chlorine, fluorine, bromine and iodine.

Examples of suitable compounds which may be incorporated with the polycarbonate resins to impart flame resistance thereto are lead dimethyldithiocarbamate, lead diethyldithiocarbamate, cadmium diethyldithiocarbamate, lead dibutyldithiocarbamate, zinc diethyldithiocarbamate, zinc dibutyldithiocarbamate, zinc dimethyldithiocarbamate, tin dimethyldithiocarbamate, tin diethyldithiocarbamate, tin dibutyldithiocarbamate, iron dipropyldithiocarbamate, iron dibutyldithiocarbamate, iron dimethyldithiocarbamate, zinc dioctyldithiocarbamate, tin dioctyldithiocarbamate, lead dioctyldithiocarbamate, zinc dicyclohexyldithiocarbamate, tin dicyclopentyldithiocarbamate, tin diphenyldithiocarbamate, lead dinaphthyldithiocarbamate, tin ditolyldithiocarbamate, and the like. Metal salts of carboxylic acids which are suitable as flame extinguishing agents are tin laurate, lead palmitate, zinc stearate, lead stearate, lead caprate, tin oleate, lead salt of a coconut fatty acid, a tin salt of a tall oil acid, a zinc salt of linseed oil fatty acid and the like.

Examples of metallic mercaptobenzothiazoles which may be used in the present invention are tin mercaptobenzothiazole, lead mercaptobenzothiazole, zinc mercaptobenzothiazole, iron mercaptobenzothiazole and the like.

Other metallic derivatives of organic compounds may be used in the instant invention such as, for example, iron acetyl acetonate, zinc acetyl acetonate, tin acetyl acetonate, lead acetyl acetonate, cobalt acetyl acetonate and the like.

Suitable metallic halides which may be used in this invention are zinc chloride, zinc bromide, lead chloride, lead fluoride, tin chloride, tin bromide, ferric chloride, cadmium chloride and the like.

The amount of extinguishing agent will vary depending upon the polycarbonate used. Such amounts are relatively simple to determine by experimentation. For example, very small amounts of the extinguishing agent are added to the polycarbonate and the amount is increased until the desired degree of flame resistance is obtained. Normally, less than about $0.2 \times 10^{-5}$ mol percent of metallic moiety will not exert any flame resistant effect and more than about $100 \times 10^{-5}$ mol percent of metallic moiety based on the weight of polycarbonate will not result in any substantial increase in the degree of flame resistance. Preferably from about $0.5 \times 10^{-5}$ to about $20 \times 10^{-5}$ mol percent of metallic moiety based on the weight of polycarbonate is sufficient to impart flame resistant properties to the polycarbonate material. However, the amount of metallic moiety may be below about $0.5 \times 10^{-5}$ mol percent, or above about $20 \times 10^{-5}$ mol percent.

In addition a mixture of metallic salts may be employed to impart flame resistant properties to the polycarbonates.

The metal salts may be added to the polycarbonate composition in several ways. They may be added to the polycarbonate reaction mixture before, after or during the preparation of the polycarbonate. Also they may be added to polycarbonate solutions prior to evaporation of the solvent or they may be added to molten polycarbonates. In addition powdered or granular polycarbonates may be admixed with the metallic salts blended and then homogenized by melt extrusion.

In another embodiment of this invention powdered or pelleted polycarbonates may be blended with from about 2 to about 50 times the amount of metallic salts necessary to render the polycarbonate composition flame resistant. The blended material free of metallic salts in the other polycarbonate material free of metallic salts in the proportion necessary to reduce the metallic salt concentration to that level which is necessary for imparting flame resistant characteristics to the polymer.

In still another embodiment, powdered or pelleted polycarbonates may be blended with from about 2 to about 50 times the amount of metallic salts necessary to render them flame resistant and then extruded in the form of pellets. These pellets containing a concentrated amount of metallic salts may be blended with other powdered or pelleted polycarbonates in the proportion described above which will provide flame resistant characteristics and re-extruded. The polycarbonates thus produced may be formed into desirable articles by injection molding, extrusion or other processes known in the thermoplastic art.

Methods for preparing high molecular weight polycarbonates capable of being rendered flame resistant by this invention are well known. See for example, the processes disclosed in U.S. Patents 2,964,794, 3,028,365, 3,153,008, 3,187,065 and 3,215,668. For example, in U.S. Patent 3,028,365, polycarbonates are obtained by reacting di(monohydroxyaryl)alkanes with derivatives of a carbonic acid selected from the group consisting of carbonic acid diesters, phosgene, and bis-chlorocarbonic acid esters of di(monohydroxyaryl)alkanes. The di(monohydroxyaryl)alkanes can be re-esterified with carbonic acid diesters, e.g. dimethyl, diethyl, dipropyl, dibutyl, diamyl, dioctyl, dicyclohexyl, diphenyl and di-, o-, p-tolyl carbonate at elevated temperatures from about 50 to about 320° C. and especially from about 120° C. to about 280° C.

The polycarbonates can also be prepared by introducing phosgene into solutions of di(monohydroxyaryl)alkanes in organic bases, such as dimethyl aniline, diethyl aniline, triethyl amine, and pyridine or into solutions of di(monohydroxyaryl)alkanes in indifferent organic solvent, such as benzene, ligroin, cyclohexane, methylcyclohexane, toluene, xylene, chloroform, methylene chloride, carbon tetrachloride, trichloro ethylene, dichloro ethane, methyl acetate and ethyl acetate with addition of an acid binding agent as mentioned above.

A process particularly suitable for producing polycarbonates consists in introducing phosgene into an aqueous solution or suspension of alkali metal salts, such as, lithium, sodium, potassium, and calcium salts of the di(monohydroxyaryl)alkanes, preferably in the presence of an excess of a base such as lithium, sodium, potassium, and calcium hydroxide or carbonate. The polycarbonate precipitates out from the aqueous solution. The conversion in the aqueous solution is promoted by the addition of indifferent solvents of the kind mentioned above which are capable of dissolving phosgene and eventually the produced polycarbonate.

In addition, polymeric materials containing a multiplicity of urethane and carbonate linkages in random block distribution may be prepared by reacting a bischloroformate of a bisphenol with a diamine and dihydroxy compound which contains two hydroxy groups capable of reacting with chloroformate to form the carbonate esters. Likewise, aromatic, aliphatic or araliphatic diisocyanates may be reacted with a di(monohydroxyaryl)alkane which is then reacted with an additional quantity of a di(monohydroxyaryl)alkane and phosgene.

These high molecular weight polycarbonates may be produced from a great number of dihydroxy compounds, that is, of aliphatic, cycloaliphatic and aromatic dihydroxy compounds, preferably from aromatic dihydroxy compounds. The preferred high molecular weight polycarbonates thus formed may be represented by the formula

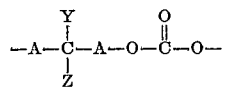

wherein each —A— is selected from the group consisting of phenylene, halo substituted phenylene and alkyl substituted phenylene and Y and Z are each selected from the group consisting of hydrogen, hydrocarbon radicals free from aliphatic unsaturation and of radicals which together and with the adjoining

atom form a cycloalkane radical and the total number of carbon atoms in Y and Z being up to about 12.

Examples of the aromatic compounds are di(monohydroxyaryl)-alkanes, di(monohydroxyaryl)sulphones, di-(monohydroxyaryl)ethers, and di(monohydroxyaryl)thioethers. The above aryl radicals may be the same or different and in addition, they may have substituents such as halogens, and/or alkyl radicals. The radical linking the benzene ring of the di(monohydroxyaryl)alkanes may be alkyl, cycloalkyl or aryl.

Representative of these aromatic dihydroxy compounds are hydroquinone, resorcinol, pyrocatechol, 4,4'-dihydroxydiphenylene, 2,2'-dihydroxydiphenylene, 1,4-dihydroxyaryl)alkanes, di(monohydroxyaryl)sulphones, dihydroxynaphthalene, 1,6 - dihydroxynaphthalene, 2,6 - dihydroxynaphthalene, 1,2 - dihydroxynaphthalene, 1,5-dihydroxynaphthalene, dihydroxy anthracene, and O-, m- and p - hydroxy benzyl alcohol and the like. Preferred classes of aromatic dihydroxy compounds are the di(monohydroxyaryl)alkanes such as 1,1-bis - (4 - hydroxyphenyl) - ethane, 1,1 - bis - (4-hydroxyphenyl)-butane, 1,1-bis-(4-hydroxyphenyl)-2-methyl-propane, 1,1-bis-(4-hydroxyphenyl)-heptane, 1,1-bis-(4-hydroxyphenyl)-1-phenyl-methane, bis-(4-hydroxyphenyl)-4-methylphenyl-methane, bis(4-hydroxyphenyl)-4-ethylphenyl - methane, bis-(4-hydroxyphenyl) - 4 - isopropylphenyl - methane, bis(4-hydroxyphenyl)-4-butylphenyl-methane, bis - (4-hydroxyphenyl) - benzyl methane, bis-(4-hydroxyphenyl) - alpha - furyl - methane, 2,2-bis-(4-hydroxyphenyl)-propane, 2,2-bis-(4 - hydroxyphenylene) - butane, 2,2-bis-(4-hydroxyphenyl)-pentane, 2,2-bis-(4-hydroxyphenyl)-4-methyl pentane, 2,2-bis-(4-hydroxyphenyl)-octane, 1,1-bis(4-hydroxyphenyl)-1-phenyl ethane, 3,3-bis-(4-hydroxyphenyl)-pentane, 2,2-bis-(4-hydroxyphenyl)-decahydronaphthalene, 2,2-bis-(4 - hydroxy - 3 - cyclohexylphenyl) - propane, 2,2-bis-(4-hydroxy-3-butylphenyl) - propane, 1,1-bis-(4 - hydroxy-3-methyl - 6 - butylphenyl)-butane, 1,1-bis-(4-hydroxy-3-methyl - 6 - tert. - butylphenyl) - butane, 1,1-bis-(4-hydroxy-3-methyl-6-tert. - butylphenyl) - heptane, 1,1-bis-(4-hydroxy-3-methyl-6-tert. - butylphenyl) - 2 - ethyl-2-hexane. Other aromatic dihydroxy compounds are the di-(monohydroxyaryl) sulphones such as bis-(4-hydroxyphenyl) sulphone, bis-(2-hydroxyphenyl) sulphone, bis-(3-hydroxyphenyl) sulphone, bis-(4-hydroxy-2-methylphenyl) sulphone, bis-(4-hydroxy-3-methylphenyl) sulphone, bis - (2 - hydroxy-4-methylphenyl) sulphone, bis-(4-hydroxy-2-ethylphenyl) sulphone, bis - (4 - hydroxy-3-ethylphenyl) sulphone, bis - (4 - hydroxy-2-tert. - butylphenyl) sulphone, bis-(4-hydroxy-3-tert.-butylphenyl) sulphone and bis-(2-hydroxy-1-naphthyl) sulphone.

Dihydroxy aromatic ethers such as p,p'-dihydroxydiphenyl ether, p,p'-dihydroxytriphenylether, the 4,3'-, 4,2'-, 4,1'-, 2,2'-, 2,3'-, etc., dihydroxy ethers may also be used. Examples of other ethers are bis-(4-hydroxy-3-isobutylphenyl) ether, 4,4'-dihydroxy-2,6-dimethyl diphenyl ether, 4,4'-dihydroxy 2,5-dimethyldiphenyl ether, 4,4'-dihydroxy-3,2-dinitrodiphenyl ether and the like.

Among the great number of suitable di(monohydroxyaryl) alkanes, the bis-(4-hydroxyphenyl) alkanes are preferred, especially 2,2-bis-(4-hydroxyphenyl)-propane.

Suitable examples of aliphatic dihydroxy compounds are ethylene glycol, diethylene glycol, triethylene glycol, polyethylene glycol, thiodiglycol, ethylene dithiodiglycol, the di- and poly-glycols produced from propylene oxide-1,2, o-, m- and p-xylene glycol, propanediol-1,3, butanediol-1,3, butanediol - 1,4, 2-methylpropanediol-1,3, pentanediol - 1,5, 2 - ethylpropanediol - 1,3, hexanediol-1,6, octanediol-1,8, 1-ethylhexanediol-1,3, and decanediol-1,10.

Examples of the cycloaliphatic dihydroxy compounds are cyclohexanediol-1,4, cyclohexanediol-1,2, 2,2-bis-(4-hydroxycyclohexyl)-propane, and 2,6-dihydroxydecahydronaphthalene.

In the production of polycarbonates according to the various processes, it is advantageous to employ small amounts of reducing agents, for example, sodium or potassium sulphide, -sulphite, and -dithionite or free phenol and p-tertiarybutylphenol.

By adding monofunctional compounds which are capable of reacting with phosgene or with the end groups of the polycarbonate consisting of the chlorocarbonic acid ester group and which terminate the chains, such as phenols, for instance, a phenol, tertiary butyl phenol, cyclohexyl phenol and 2,2-(4,4-hydroxyphenyl-4'-methoxyphenyl)-propane and other monofunctional compounds such as aniline and methyl aniline, it is possible to regulate the molecular weight of the polycarbonate.

It has been discovered that flame resistance or self-extinguishing polycarbonates having desirable physical properties can be readily prepared by incorporating in the polycarbonate composition a minute quantity of metallic salts to impart self-extinguishing characteristics thereto. It has been found that the amount of flame resistant additives is a highly significant factor in preparing flame resistant polycarbonates without incurring deleterious effects or an appreciable loss of desirable physical properties. The achievement of flame resistance at a low additive level thus provides for a broad spectrum of self-extinguishing polycarbonates without materially affecting their physical and mechanical properties. By means of this invention, self-extinguishing polycarbonates of widely varying and preselected properties are readily prepared thereby considerably broadening the realm of practical utility.

The term "self-extinguishing" as used herein characterizes a material which may burn when a flame is applied but will extinguish itself when the flame is removed. A test for self-extinguishing plastics is defined by Underwriters' Laboratories, Inc. in their memorandum bulletin, Subject 94, "Burning Tests of Plastics," Dec. 9, 1959.

In this test, molded specimens ¼" x ½" x 6" and 1/16" x ½" x 6" are placed in a vertical position so that their lower end is 3/8" above the top of the Bunsen burner tube and the flame of the burner is adjusted to produce a blue flame ¾" in height. The test flame is placed centrally under the lower end of the test specimen and allowed to remain for 10 seconds. The test flame is then withdrawn, and the duration of flaming or glowing combustion of the specimen noted. If flaming or glowing combustion of the specimen ceases within 30 seconds after removal of the test flame, the test flame is again placed under the specimen for 10 seconds immediately after flaming or glowing combustion of the specimen stops. The test flame is again withdrawn, and the duration of flaming or glowing combustion of the specimen noted.

The duration of flaming or glowing combustion of any single specimen after application of the test flame shall not exceed 30 seconds and the average of three specimens (six flame applications) shall not exceed 25 seconds. Furthermore, the specimens shall not be completely consumed in the test. In other words, 100% of all specimens tested in both ¼" and 1/16" thickness must pass the 30-second test. These requirements apply to the specimens tested both before and after aging in an oven at 70° C. (158° F.) for 7 days.

Materials which comply with the above requirements but drip flaming particles or droplets which burn only briefly during the test are classified as "self-extinguishing, Group II" plastics.

These polycarbonate compositions find widespread utility in the field of insulation, structural reinforcement, electrical encapsulation and in domestic electrical equipment.

In order to more fully and clearly illustrate the present invention, the following specific examples are presented. It is intended that the examples be considered as illustrative rather than limiting on the invention disclosed and claimed herein. In the examples, all parts are by weight unless otherwise specified.

Example 1

To a mixture containing about 548 parts of 2,2-(4,4'-dihydroxydiphenyl)-propane, about 268 parts of caustic soda, about 2,460 parts of water, about 1,320 parts of methylene chloride, about 0.48 part of sodium dithionite and about 4 parts of p-tert.-butylphenol is added about 288 parts of phosgene with stirring at a temperature of about 25° C. over a period of about 2 hours. The mixture is stirred at room temperature for an additional 4 hours. The aqueous layer is separated and the polycarbonate solution is washed with water. The methylene chloride solvent is evaporated off and a dried friable granular polycarbonate material is thus obtained. The granular polycarbonate material is blended with varying amounts of metallic salts by melt extrusion and molded into ¼″ x ½″ x 6″ and ¹⁄₁₆″ x ½″ x 6″ test bars. The bars are then tested for flammability characteristics in accordance with Underwriters' Laboratories, Inc. procedure for determining the flammability of plastic material. The results of these tests are illustrated in Table I.

TABLE I

| Metallic Salts | Parts per 10⁶ Parts Polymer | Mol Percent Metal | Flammability Test, Percent Bars Passing | |
|---|---|---|---|---|
| | | | ¼″ | ¹⁄₁₆″ |
| Example 1: | | | | |
| (a) | | | 56 | 65 |
| (b) Lead chloride | 28 | 1×10⁻⁵ | 100 | 100 |
| (c) do | 14 | 0.5×10⁻⁵ | 100 | 100 |
| (d) do | 5.6 | 0.2×10⁻⁵ | 100 | 100 |
| (e) do | 280 | 10×10⁻⁵ | 100 | 100 |
| (f) Zinc chloride | 14 | 1×10⁻⁵ | 100 | 100 |
| (g) Stannous chloride | 19 | 1×10⁻⁵ | 100 | 100 |
| (h) Ferric acetyl acetonate | 31.5 | 0.9×10⁻⁵ | 100 | 100 |
| (i) do | 63 | 1.8×10⁻⁵ | 100 | 100 |
| (j) do | 140 | 4×10⁻⁵ | 100 | 100 |
| (k) Zinc mercaptobenzothiazole | 42 | 1×10⁻⁵ | 100 | 100 |
| (l) Stannous octoate | 41 | 1×10⁻⁵ | 100 | 100 |
| (m) do | 82 | 2×10⁻⁵ | 100 | 100 |
| (n) do | 820 | 20×10⁻⁵ | 100 | 100 |

Example 2

The granular polycarbonate material of Example 1 is blended with varying amounts of metallic phosphates by melt extrusion and molded into ¼″ and ¹⁄₁₆″ test bars. The bars are tested in accordance with Underwriters' Laboratories procedure for determining the self-extinguishing properties of plastic material. The results are shown in Table II.

TABLE II

| Metallic Salts | Parts per 10⁶ Parts Polymer | Mol Percent Metal | Flammability Test, Percent Bars Passing | |
|---|---|---|---|---|
| | | | ¼″ | ¹⁄₁₆″ |
| Example 2: | | | | |
| (a) | | | 56 | 65 |
| (b) Ferric phosphate | 61 | 1.8×10⁻⁵ | 95 | 75 |
| (c) Zinc phosphate | 117 | 4.35×10⁻⁵ | 100 | 60 |

The results of these tests illustrate that the bars stabilized with the metal phosphate salts failed to pass the Underwriters' Laboratories, Inc., test for self-extinguishing Group II plastics.

Example 3

The granular polycarbonate material prepared in accordance with Example 1 is blended with a mixture of metallic salts by melt extrusion and molded into ¼″ and ¹⁄₁₆″ test bars. These bars are then tested in accordance with Underwriters' Laboratories procedure for determining flammability characteristics. The results of these tests are shown in Table III.

TABLE III

| Metallic Salts | | Parts per 10⁶ Parts Polymer | Mol Percent Metal | Flammability Test, Percent Bars Passing | |
|---|---|---|---|---|---|
| | | | | ¼″ | ¹⁄₁₆″ |
| Example 3: | | | | | |
| (a) | | | | 56 | 65 |
| (b) | Ferric acetylacetonate | 63 | 1.8×10⁻⁵ | 70 | |
| | Triphenyl phosphate | 1,000 | | | |
| (c) | Ferric acetylacetonate | 63 | 1.8×10⁻⁵ | 43 | |
| | Tris(nonylphenyl)phosphite | 1,000 | | | |
| (d) | Ferric acetylacetonate | 63 | 1.8×10⁻⁵ | 40 | |
| | Tris(nonylphenyl)phosphite | 250 | | | |

In comparison with Table I, these tests illustrate that a mixture of ferric acetylacetonate and a triphenyl phosphate or tris(nonylphenyl) phosphite does not improve the flame resistant properties of a polycarbonate resin.

Example 4

To a solution of about 1,024 parts of 2,2-(4,4'-dihydroxydiphenyl)-pentane in about 6,560 parts of a 10% caustic solution are added about 2,000 parts of methylene chloride and at a temperature of about 25° C. approximately 600 parts of phosgene are added with agitation over a period of about 3 hours. The mixture is stirred for an additional hour and then slowly heated to about 50° C. and maintained at this temperature for about 1 hour. The aqueous layer is then separated and the polycarbonate formed is diluted with additional methylene chloride. The methylene chloride solution is shaken with dilute hydrochloric acid until neutral and washed with water. The methylene chloride solvent is removed under vacuo, yielding a friable mass which is recovered as granular material. The granular polycarbonate material is blended with varying amounts of metallic salts by melt extrusion and molded into ¼″ and ¹⁄₁₆″ test bars. The bars are then tested for flammability characteristics in accordance with the test proposed by Underwriters' Laboratories, Inc. The results of these tests are illustrated in Table IV.

TABLE IV

| Metallic Salts | | Parts per $10^6$ Parts Polymer | Mol Percent Metal | Flammability Test, Percent Bars Passing | |
|---|---|---|---|---|---|
| | | | | $\frac{1}{4}''$ | $\frac{1}{16}''$ |
| Example 4: | | | | | |
| (a) | | | | 53 | 40 |
| (b) | Ferric acetyl acetonate | 63 | $1.8 \times 10^{-5}$ | 100 | 100 |
| (c) | Zinc mercaptobenzothiazole | 76 | $1.8 \times 10^{-5}$ | 100 | 100 |
| (d) | do | 168 | $4 \times 10^{-5}$ | 100 | 100 |
| (e) | Cobaltous acetyl acetonate | 43 | $1.6 \times 10^{-5}$ | 100 | 100 |
| (f) | Zinc dimethyldithiocarbamate | 65 | $2 \times 10^{-5}$ | 100 | 100 |
| (g) | Cobaltic acetyl acetonate | 60 | $1.6 \times 10^{-5}$ | 100 | 100 |
| (h) | Lead dimethyldithiocarbamate | 80 | $1.8 \times 10^{-5}$ | 100 | 100 |
| (i) | Selenium dimethyldithiocarbamate | 69 | $1.8 \times 10^{-5}$ | 100 | 100 |

Example 5

To a solution of about 7.2 parts of bis-chlorocarbonic acid ester of 2,2-(4,4'-dihydroxydiphenyl)-propane in about 480 parts of absolute methylene chloride is added dropwise with stirring. A solution containing about 304 parts of 2,2-(4,4'-dihydroxydiphenyl)-propane in about 42 parts of absolute pyridine and about 480 parts of absolute methylene chloride is added at a temperature of about 0° C. over a period of about 60 minutes. The mixture is stirred at room temperature for several hours and then shaken out with water and dried. After evaporation of the solvent, a friable mass which can be broken up into granules is recovered. The granular polycarbonate material is blended with varying amounts of metallic salts by melt extrusion and molded into $\frac{1}{4}''$ and $\frac{1}{16}''$ test bars. The bars are then tested for flammability characteristics in accordance with the test proposed by Underwriters' Laboratories, Inc. The results of these tests are illustrated in Table V.

TABLE V

| Metallic Salts | | Parts per $10^6$ Parts Polymer | Mol Percent Metal | Flammability Test, Percent Bars Passing | |
|---|---|---|---|---|---|
| | | | | $\frac{1}{4}''$ | $\frac{1}{16}''$ |
| Example 5: | | | | | |
| (a) | | | | 0 | 80 |
| (b) | Di-n-butyl tin laurate | 53.5 | $0.85 \times 10^{-5}$ | 100 | 100 |
| (c) | Di-n-butyl tin thiodipropionate | 35 | $0.85 \times 10^{-5}$ | 100 | 100 |
| (d) | Stannous octoate | 35 | $0.85 \times 10^{-5}$ | 100 | 100 |
| (e) | do | 81.5 | $2 \times 10^{-5}$ | 100 | 100 |
| (f) | Stannous octoate / Tris(nonylphenyl)phosphite | 35 / 1,000 | $0.85 \times 10^{-5}$ | 60 | 0 |
| (g) | Tris(nonylphenyl)phosphite | 1,000 | | 0 | |

Example 6

A polycarbonate powder in powdered form which had been prepared from 2,2-(4,4'-dihydroxydiphenyl)-propane and phosgene is mixed with 0.0092 percent magnesium acetyl acetonate by melt extrusion and molded into $\frac{1}{4}''$ and $\frac{1}{16}''$ test bars. The additive entails $4 \times 10^{-5}$ mol percent of the metal component. The bars are then tested for flammability characteristics in accordance with the procedure proposed by Underwriters' Laboratories, Inc. All the bars passed the flammability test and were characterized as self-extinguishing Group II plastics.

Example 7

A polycarbonate in powdered form which had been prepared from 2,2-(4,4'-dihydroxydiphenyl)-propane and phosgene is mixed with 0.0046 percent manganous acetyl acetonate by melt extrusion. The additive entails $1.75 \times 10^{-5}$ mol percent of the metal component. The composition is molded into $\frac{1}{4}''$ and $\frac{1}{16}''$ test bars and tested in accordance with the procedure developed by Underwriters' Laboratories, Inc. for determining the flammability characteristics of plastics. The test bars were deemed to be acceptable and classified as self-extinguishing Group II plastics.

Example 8

To a sodium bis-phenate solution prepared by mixing about 228 parts of bisphenol A with about 250 parts of a 10 percent sodium hydroxide solution and about 300 parts by volume of methylene chloride maintained at a temperature of 25° to 30° C. is added about 58.1 parts of hexamethylene diamine and about 300 parts by volume of methylene chloride. Approximately 565 parts of bisphenol A bischloroformate in about 750 parts by volume of methylene chloride is added to the mixture while maintaining the temperature at about 25 to 30° C. The resultant viscous white reaction mixture is stirred for an additional hour after addition of the chloroformate has been completed and then allowed to stand for about 14 hours. The reaction mixture is then diluted with about 2500 parts by volume of methylene chloride and washed thoroughly with water. The mixture is then washed with an aqueous solution which contains about 3 percent by weight of pyridine and about 2 percent by weight of sodium hydroxide. Thereafter it is washed to neutrality with a dilute aqueous hydrochloric acid solution and thereafter washed with water. Substantially all the solvent is removed by evaporation prior to the addition of varying amounts of metallic salts. The remainder of the solvent is removed and the mixture formed into $\frac{1}{4}''$ and $\frac{1}{16}''$ test bars. These bars are then tested for flammability characteristics in accordance with the procedure proposed by Underwriters' Laboratories, Inc. as described above. The results of these flammability tests are illustrated in Table VI.

TABLE VI

| Metallic Salts | | Parts per 10⁶ Parts Polymer | Mol Percent Metal | Flammability Test, Percent Bars Passing | |
|---|---|---|---|---|---|
| | | | | ¼″ | ¹⁄₁₆″ |
| Example 8: | | | | | |
| (a) | | | | 30 | 80 |
| (b) | Lead chloride | 14 | 0.5×10⁻⁵ | 100 | 100 |
| (c) | Zinc chloride | 28 | 2×10⁻⁵ | 100 | 100 |
| (d) | do | 35 | 5×10⁻⁵ | 100 | 100 |
| (e) | Stannous chloride | 95 | 5×10⁻⁵ | 100 | 100 |
| (f) | Ferric chloride | 32 | 2×10⁻⁵ | 100 | 100 |
| (g) | Cadmium chloride | 33 | 1.8×10⁻⁵ | 100 | 100 |

Example 9

A polycarbonate in pelleted form, which had been prepared from 2,2-bis(4-hydroxyphenyl) propane and phosgene, is dry-blended with varying amounts of metallic salts which are then homogenized by melt extrusion and are then molded into ¼″ and ¹⁄₁₆″ test specimens. The flammability characteristics of these specimens are then determined in accordance with the Underwriters' Laboratories' procedure, and the results illustrated in Table VII.

TABLE VII

| Metallic Salts | | Parts per 10⁶ Parts Polymer | Mol Percent Metal | Flammability Test, Percent Bars Passing | |
|---|---|---|---|---|---|
| | | | | ¼″ | ¹⁄₁₆″ |
| Example 9: | | | | | |
| (a) | | | | 40 | 60 |
| (b) | Iron distearate | 111 | 1.8×10⁻⁵ | 100 | 100 |
| (c) | Cadmium stearate | 119 | 1.8×10⁻⁵ | 100 | 100 |
| (d) | Lead stearate | 139 | 1.8×10⁻⁵ | 100 | 100 |
| (e) | Zinc stearate | 113 | 1.8×10⁻⁵ | 100 | 100 |
| (f) | Calcium stearate | 109 | 1.8×10⁻⁵ | 100 | 100 |

Example 10

A polycarbonate in pelleted form which had been prepared from 2,2-bis(4-hydroxyphenyl) propane and phosgene, is dry-blended with varying amounts of metallic salts which are then homogenized by melt extrusion and are then molded into ⅛″-thick test specimens. The impact strengths of the test specimens are determined at 73° F. by the procedure outlined in ASTM D256 ("Izod" method). The results are illustrated in Table VIII.

TABLE VIII

| Metallic Salts | | Parts per 10⁶ Parts Polymer | Mol Percent Metal | Impact Strength, ft.-lb./in. |
|---|---|---|---|---|
| Example 10: | | | | |
| (a) | | | | 17.2 |
| (b) | Ferric acetylacetonate | 63 | 1.8×10⁻⁵ | 17.3 |
| (c) | Lead chloride | 28 | 2×10⁻⁵ | 17.2 |
| (d) | Lead dimethyldithiocarbamate | 45 | 1×10⁻⁵ | 17.1 |
| (e) | Zinc mercaptobenzothiazole | 210 | 5×10⁻⁵ | 17.1 |
| (f) | do | 340 | 20×10⁻⁵ | 17.0 |
| (g) | Stannous octoate | 205 | 5×10⁻⁵ | 17.2 |

In addition, the metallic salts may be incorporated into the polycarbonate solution prior to evaporation of the solvent with substantially the same results.

The foregoing discussion illustrates specific examples and specific procedures used to prepare flame resistant compositions which are encompassed within the spirit of the invention. It should be understood, however, that anyone skilled in the art upon reading this basic invention will consider other ramifications and deviations relating to these compositions which are considered to be within the scope and purview of this invention except as set forth in the claims.

What is claimed is:

1. A self-extinguishing polycarbonate composition comprising a polycarbonate and a metallic salt having the formula $$M(X)_n$$

wherein M is a polyvalent metal classified in Groups II, IV, VI, VII or VIII of the periodic system of elements, X is an organic dithiocarbamate radical having the formula

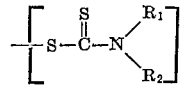

wherein $R_1$ and $R_2$ are hydrocarbon radicals having from 1 to 20 carbon atoms, and $n$ is an integer equal to the valence of M, said metal component being present in an amount of from about $0.5 \times 10^{-5}$ to about $20 \times 10^{-5}$ mol percent.

2. A self-extinguishing polycarbonate composition comprising a polycarbonate and a metallic salt having the formula $$M(X)_n$$

wherein M is a polyvalent metal classified in Groups II, IV, VI, VII or VIII of the periodic system of elements, X is an acetyl acetonate radical having the formula

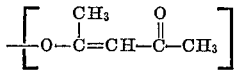

and $n$ is an integer equal to the valence of M, said metal component being present in an amount of from about $0.5 \times 10^{-5}$ to about $20 \times 10^{-5}$ mol percent.

3. A self-extinguishing polycarbonate composition comprising a polycarbonate and a metallic salt having the formula $$M(X)_n$$

wherein M is a polyvalent metal classified in Groups II, IV, VI, VII or VIII of the periodic system of elements, X is a mercaptobenzothiazole radical of the formula

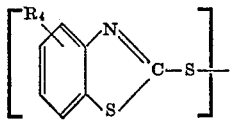

wherein $R_4$ is selected from the group consisting of hydrogen, halogen and a monovalent hydrocarbon radical having from 1 to 4 carbon atoms, and $n$ is an integer equal to the valence of M, said metal component being present in an amount of from about $0.5 \times 10^{-5}$ to about $20 \times 10^{-5}$ mol percent.

4. A self-extinguishing polycarbonate composition comprising a polycarbonate and a metallic salt having the formula $$M(X)_n$$

wherein M is a polyvalent metal classified in Groups II, IV, VI, VII or VIII of the periodic system of elements, X is a halide selected from the group consisting of chloride, fluoride, bromide and iodide, and $n$ is an integer equal to the valence of M, said metal component being present in an amount of from about $0.5 \times 10^{-5}$ to about $20 \times 10^{-5}$ mol percent.

References Cited

UNITED STATES PATENTS

| | | | |
|---|---|---|---|
| 3,243,393 | 3/1966 | Bartom | 260—18 |
| 3,274,156 | 9/1966 | Perry | 260—18 |
| 3,357,942 | 12/1967 | Jackson et al. | 260—45.7 |

FOREIGN PATENTS 670,376   3/1966   Belgium.

HOSEA E. TAYLOR, JR., Primary Examiner

U.S. Cl. X.R.

252—8.1; 260—45.7, 18, 24, 45.8, 45.85, 45.9